(12) United States Patent
Friman

(10) Patent No.: US 6,819,923 B1
(45) Date of Patent: Nov. 16, 2004

(54) METHOD FOR COMMUNICATION OF NEIGHBOR CELL INFORMATION

(75) Inventor: Leif Friman, Järvenpää (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/831,689

(22) PCT Filed: Dec. 16, 1999

(86) PCT No.: PCT/FI99/01048
§ 371 (c)(1),
(2), (4) Date: Jun. 12, 2001

(87) PCT Pub. No.: WO00/36853
PCT Pub. Date: Jun. 22, 2000

(30) Foreign Application Priority Data

Dec. 16, 1998 (FI) .................................... 982726

(51) Int. Cl.⁷ .............................................. H04Q 7/20
(52) U.S. Cl. .................. 455/424; 455/436; 455/437; 455/524; 455/442; 370/331; 370/332; 370/333
(58) Field of Search .................. 455/437, 436, 455/434, 442, 424, 524; 370/331–333

(56) References Cited

U.S. PATENT DOCUMENTS

| | | | | |
|---|---|---|---|---|
| 4,850,033 A | * | 7/1989 | Eizenhofer et al. | 455/450 |
| 5,267,261 A | * | 11/1993 | Blakeney et al. | 370/332 |
| 5,499,387 A | * | 3/1996 | Chambert | 455/436 |
| 5,640,677 A | * | 6/1997 | Karlsson | 455/434 |
| 5,724,665 A | * | 3/1998 | Abbasi et al. | 455/561 |
| 5,774,809 A | * | 6/1998 | Tuutijarvi et al. | 455/437 |
| 5,794,157 A | * | 8/1998 | Haartsen | 455/522 |
| 5,848,063 A | * | 12/1998 | Weaver et al. | 370/331 |
| 5,850,605 A | * | 12/1998 | Souissi et al. | 455/437 |
| 5,854,981 A | * | 12/1998 | Wallstedt et al. | 455/439 |
| 5,903,840 A | * | 5/1999 | Bertacchi | 455/436 |
| 5,913,168 A | * | 6/1999 | Moreau et al. | 455/441 |
| 5,930,721 A | * | 7/1999 | Fried et al. | 455/466 |
| 5,953,320 A | * | 9/1999 | Williamson et al. | 370/252 |
| 5,982,758 A | * | 11/1999 | Hamdy | 370/331 |
| 5,991,626 A | * | 11/1999 | Hinz et al. | 455/436 |
| 5,995,836 A | * | 11/1999 | Wijk et al. | 455/436 |

(List continued on next page.)

FOREIGN PATENT DOCUMENTS

| | | | |
|---|---|---|---|
| EP | WO 98/31154 | 7/1998 | ............ H04Q/7/38 |
| EP | 0 886 453 A2 | 12/1998 | ............ H04Q/7/30 |
| EP | 0 895 435 A1 | 2/1999 | ............ H04Q/7/34 |
| GB | 2 335 831 | 9/1999 | ............ H04Q/7/22 |
| WO | WO 98/53621 | 11/1998 | ............ H04Q/7/00 |
| WO | WO 99/01005 | 1/1999 | ............ H04Q/7/38 |
| WO | WO 99/13666 | 3/1999 | ............ H04Q/7/22 |
| WO | WO 99/17571 | 4/1999 | ............ H04Q/7/34 |
| WO | WO 99/62278 | 12/1999 | ............ H04Q/7/20 |

*Primary Examiner*—William Trost
*Assistant Examiner*—Sharad Rampuria
(74) *Attorney, Agent, or Firm*—Cohen, Pontani, Lieberman & Pavane (57) ABSTRACT

The invention is related to signaling in cellular telecommunication systems, namely to reduction of resources used by signaling. According to the invention, a list of neighbor cell information is communicated to a mobile station in compressed form. Preferably, the neighbor cell information list is transmitted in such a way, that a table reciting parameter values in use by the neighboring cells, and for each of these cells, each value listed in the table is represented by a pointer such as an index to the table. In this way, same parameter values do not need to be repeated for each cell using the same values. The neighbor cell information list can be further compressed by expressing a first frequency parameter value in the normal way, but expressing further frequency parameter values relative to the first, or as in a further embodiment, relative to the previous frequency parameter value. Such ways of representing frequency values allow the use of fewer bits to represent the frequency values.

20 Claims, 4 Drawing Sheets

U.S. PATENT DOCUMENTS

| | | | |
|---|---|---|---|
| 6,038,450 A | * 3/2000 | Brink et al. | 455/442 |
| 6,112,089 A | * 8/2000 | Satarasinghe | 455/437 |
| 6,134,438 A | * 10/2000 | Sawyer | 455/433 |
| 6,151,502 A | * 11/2000 | Padovani et al. | 455/442 |
| 6,178,164 B1 | * 1/2001 | Wang et al. | 370/331 |
| 6,188,911 B1 | * 2/2001 | Wallentin et al. | 455/524 |
| 6,192,244 B1 | * 2/2001 | Abbadessa | 455/436 |
| 6,201,966 B1 | * 3/2001 | Rinne et al. | 455/434 |
| 6,212,384 B1 | * 4/2001 | Almgren et al. | 455/446 |
| 6,240,292 B1 | * 5/2001 | Haberman et al. | 455/439 |
| 6,473,614 B1 | * 10/2002 | Quensel et al. | 455/436 |
| 6,505,058 B1 | * 1/2003 | Willey | 455/574 |
| 6,640,102 B2 | * 10/2003 | Frodigh et al. | 455/436 |
| 2001/0053695 A1 | * 12/2001 | Wallentin | 455/436 |
| 2002/0004406 A1 | * 1/2002 | Namura et al. | 455/515 |
| 2002/0049060 A1 | * 4/2002 | Grob et al. | 455/442 |

* cited by examiner

Fig. 1

PRIOR ART

METHOD FOR COMMUNICATION OF NEIGHBOR CELL INFORMATION

CROSS-REFERENCES TO RELATED APPLICATIONS

This is a U.S. national stage of application under 35 U.S.C. §371 of international stage application No. PCT/FI99/01048, filed on Dec. 16, 1999. Priority is claimed under 35 U.S.C. §119(a) and 35 U.S.C §365(b) from Finnish patent application No. 982726, filed on Dec. 16, 1998, from which priority was properly claimed in the aforementioned international stage application.

TECHNICAL FIELD OF THE INVENTION

Background of the Invention

In the present GSM (Global System for Mobile communications) system, the network informs from time to time each mobile station about the base stations nearby the mobile station. The network performs this informing by sending a so called neighbor list to the mobile station, which neighbor list recites the basic parameters of the neighboring cells, such as the base station identity code (BSIC) of the base stations of the cells, the BCCH (Broadcast Control Channel) frequency, and several other parameters.

Figure 1:
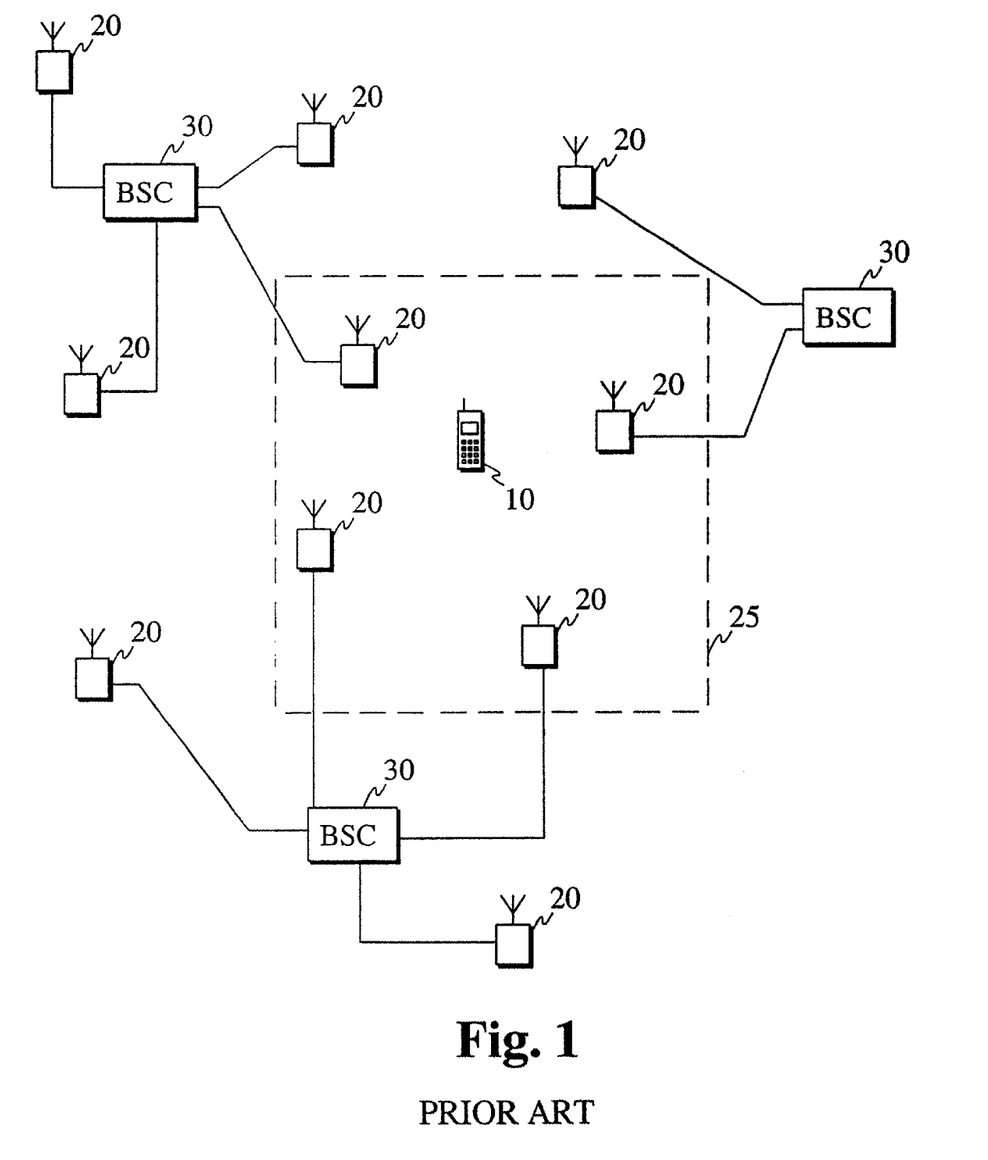
FIG. 1 illustrates the structure of a cellular telecommunication network and the concept of neighbor cells.

FIG. 1 illustrates a part of the structure of a GSM network. FIG. 1 shows a mobile station (MS) 10, base stations (BS) 20, and base station controllers (BSC) 30. For clarity, areas of the cells corresponding to the base stations and other network elements of a GSM network are not illustrated in FIG. 1. The neighboring cells are simply the cells lying nearby the mobile station. One possible selection of neighboring cells is marked with a rectangle 25 in FIG. 1.

The network 20, 30 informs the mobile station 10 about the neighboring cells in a message, which recites the cell parameters for each neighboring cell. The resulting message may be long, if the number of neighboring cells is large. According to the present GSM specifications, the maximum number of cells reported in a neighbor cell information message is 16. Due to the length of the message, the transmission time required to transmit the message is long, which results in a relatively large usage of signaling channel capacity for only this purpose. Also, during the transmission of the message the receiver of the mobile station receiving the message has to receive the message, whereby the length of the message affects considerably the receiving capacity of the mobile station. The length of the message also makes it impractical to increase the number of cells described in a neighbor cell information message, which would be advantageous especially in those locations of the network, in which a large number of cells are available to a mobile station or may become available to the mobile station due to movement of the mobile station. If the repetition frequency of sending the message would be decreased, the length of the message could be increased, but in that case, the mobile stations would receive the message less often, which could cause other difficulties. These problems are presently increasing in severity due to the present trend in the cellular telecommunication systems towards decreasing the area of cells due to increasing data rates, whereby the increasing of the number of cells described in a neighbor cell information message is desired. This trend is driven by the development of high data rate services and packet data services, such as the GPRS (General Packet Radio Service) system.

The transmitted parameters and structure of a neighbor cell information message is described in more detail in the GSM 04.08 specification.

SUMMARY OF THE INVENTION

An object of the invention is to realize a method which allows shortening the time required for the communication of a neighbor cell information message. An object of the invention is also to realize a method of communicating neighbor cell information reserving the receiver of a mobile station for a shorter time than in the prior art. A further object of the invention is to save the transmission capacity of signaling channels used for transmitting neighbor cell information messages.

The objects are reached by identifying redundant information in the neighbor cell information message, and removing at least a part of the redundancy by specifying the repeating values of at least one parameter only once.

According to the invention, a list of neighbor cell information is communicated to a mobile station in compressed form. Preferably, the neighbor cell information list is transmitted in such a way, that a table reciting parameter values in use by the neighboring cells, and for each of these cells, each value listed in the table is represented by a pointer such as an index to the table. In this way, same parameter values do not need to be repeated for each cell using the same values. The neighbor cell information list can be further compressed by expressing a first frequency parameter value in the normal way, but expressing further frequency parameter values relative to the first, or as in a further embodiment, relative to the previous frequency parameter value. Such ways of representing frequency values allow the use of fewer bits to represent the frequency values.

The inventive method of constructing a neighbor cell information message is advantageous, since the inventors have made the insightful observation, that neighboring base stations quite commonly have largely similar operation parameters, which results in the repeating of same parameter values for a plurality of cells in a neighbor cell information message. The length of a neighbor cell information message, and time and transmission capacity required for sending such a message can be considerably shortened by removing at least some of the redundancy of information in the neighbor cell information message by specifying at least some repetitive values only once, and replacing the occurrences of the value with a pointer to the single specification of the value. The inventive method of constructing a neighbor cell information message also allows the describing of more cells in a neighbor cell information message than in prior art, since the compressed message format allows the increasing of the number of base station described in the message without unduly increasing the length of the message.

BRIEF DESCRIPTION OF THE DRAWINGS

The invention is described in more detail in the following with reference to the accompanying drawings, of which

Same reference numerals are used for similar entities in the figures.

DETAILED DESCRIPTION

A. Compression of Neighbor Cell Information List

According to the invention, the neighbor cell information is transmitted to mobile stations in compressed form by reducing the amount of redundant information transmitted.

In an advantageous embodiment of the invention, those pieces of information which are repeated for a plurality of cells in the neighbor cell information list are recited in a table or some other suitable data structure, and pointers such as indexes to the table are used in the places of pieces of redundant information.

In an advantageous embodiment, such a table contains different values for one parameter. For example, if a certain parameter value is used in more than one cells, values of the particular parameter used in the neighboring cells are placed in a table, and references to a value of this parameter are replaced by a pointer such as an index to the table, which pointer specifies which of the entries in the table is to be used. Such a table is created for each parameter, which has at least one value repeating in more than one cell.

In a further embodiments of the invention, groups of parameters can be stored in a table. Such an embodiment is advantageous, if certain parameter value combinations are repeated in a plurality of cells in the neighboring cells.

B. Specification of Frequency Values

In an advantageous embodiment of the invention, the transmission capacity required for the transmission of a neighboring cell information list is further reduced by specifying a plurality of frequency values in a relative way, instead of reciting each value in full.

In a first example, the frequency values can be specified by specifying a first frequency value $F_0$ in fill, and subsequent frequency values relative to the first frequency value, i.e. by specifying the difference $\Delta f_n$ of the frequency value $F_n$ to the first frequency value $F_0$. Subsequently, the actual frequency values can be obtained by adding the difference to the first frequency value, i.e. $F_1 = F_0 + \Delta f_1$, $F_2 = F_0 + \Delta f_2$, and so on. This method of specifying the frequency values is advantageous, when the specified frequency values are not far apart, since in that case, a small number of bits is enough to represent the difference values.

In a second example, the frequency values can be specified by specifying a first frequency value $F_0$, and for subsequent frequency values, the difference to the previous frequency value. Subsequently, the actual frequency values can be obtained in the following way:

$$F_1 = F_0 + \Delta f_1$$

$$F_2 = F_1 + f_2 = F_0 + \Delta f_1 + \Delta f_2$$

$$F_3 = F_2 + \Delta f_3 = F_0 + \Delta f_1 + \Delta f_2 + \Delta f_3$$

and so on. This second example of a way of specifying frequency values performs better than the first when the frequency values cover a relatively wide range, since the cumulative calculation principle still allows the representation of the frequency value differences with a small number of bits.

In an advantageous embodiment of the invention, either of the first and the second examples ways of specifying frequency values can be used. Advantageously, the frequency value specification method is chosen based on the distribution of frequencies to be specified, i.e. based on which of the two methods allows representation of the frequency data in a smaller amount of bits.

C. An Example of a Compressed Format

FIGS. 2, 3, 4, and 5 illustrate a method of communicating a neighboring cell information list according to an advantageous embodiment of the invention. These figures illustrate the structure of a message used to communicate neighboring cell information from the network to a mobile station.

Figure 2:
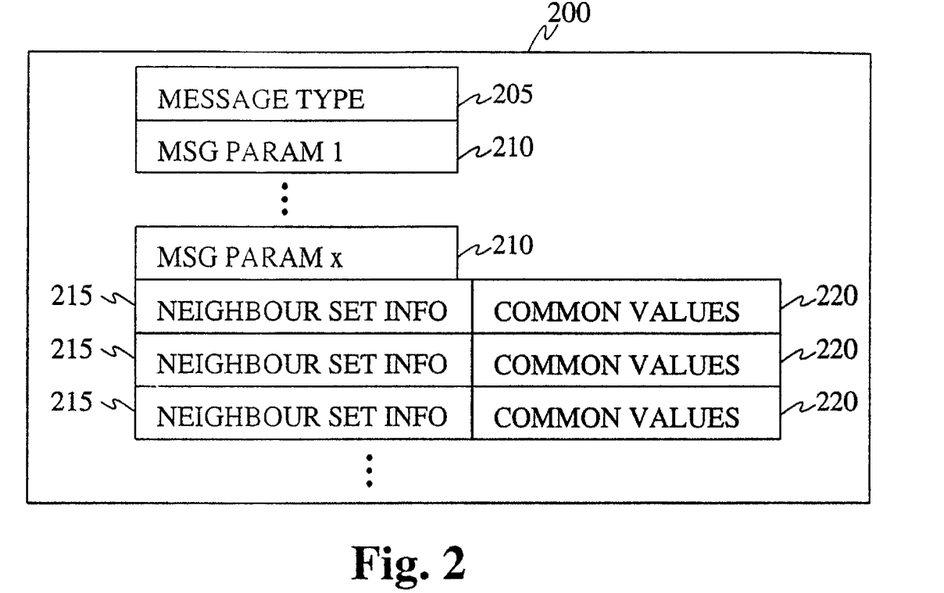
FIG. 2 illustrates the structure of a message for transmitting neighbor cell list information according to an advantageous embodiment of the invention.

FIG. 2 illustrates the general structure of a neighboring cell information message 200. The message 200 comprises a plurality of fields. The first field 205 is a message type field, which is used to indicate the message type, in this case that the message is a neighboring cell information message. Following this field, there may be zero, one, or more 210 fields which are specific to a single message. These fields may contain message-specific parameters, for example. The message further comprises one or more pairs of NEIGHBOR SET INFO 215 and COMMON VALUES 220 fields. Both of these fields contain a structure of fields, which structures are described further with reference to FIGS. 3, 4, and 5. In this specification, the term neighbor set refers to a set of neighbor cells. A neighbor cell set may cover all neighbor cells, or only some of them. The concept of a neighbor set is used for convenience: it is advantageous to group neighbor cells with similar parameters into one or more groups in order to specify the neighbor cell information in a minimum amount of bits. These groups are referred to as neighbor sets in this specification.

Figure 3:
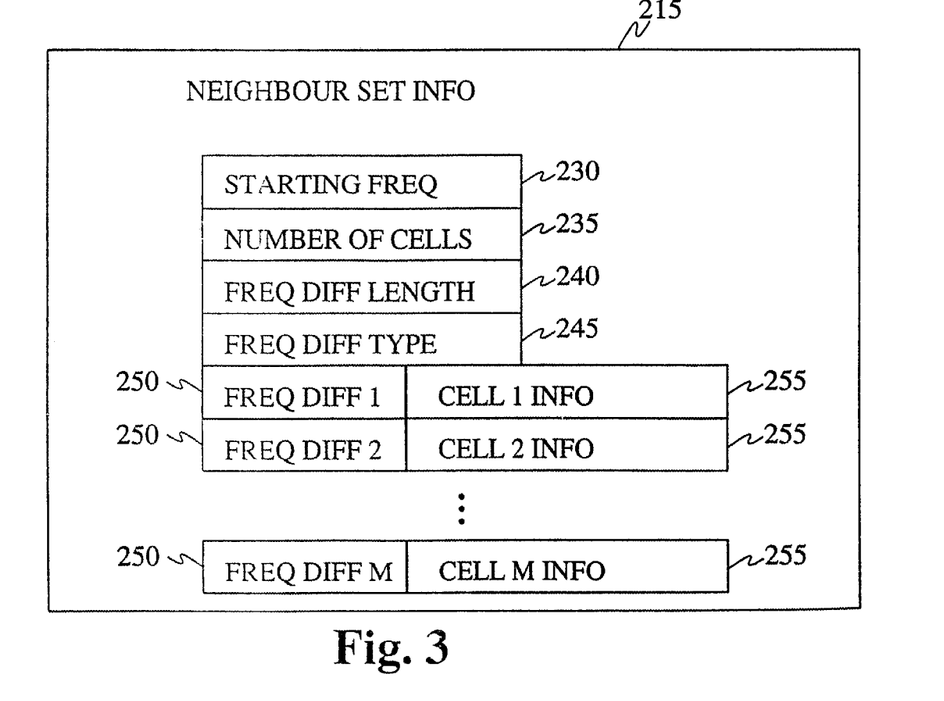
FIGS. 3 and 4 illustrate the structure of two fields in the message illustrated in FIG. 2.

FIG. 3 illustrates an example of the structure of a NEIGHBOR SET INFO field 215, which specifies the information of the cells in a single neighbor set. The field comprises a STARTING FREQ field 230, which specifies the frequency $F_0$ described previously, i.e. the BCCH frequency of the first cell of the current neighbor set. The next field 235 specifies the number M of cells in the current neighbor set. The FREQ DIFF LENGTH field 240 specifies the number of bits used to specify the frequency differences $\Delta f_n$, and the FREQ DIFF TYPE field 245 specifies, which of the available methods for specifying frequencies is used. The frequencies can be specified for example using either of the methods specified previously in section B of this specification. Further, it is also possible to specify the frequencies in the normal way, i.e. by specifying the frequencies in full in the same way as the frequency $F_0$, in which case the FREQ DIFF LENGTH field 240 should specify the number of bits needed to store a frequency value, and the FREQ DIFF TYPE field 245 should contain a predetermined value indicating that the frequency values are normal values, i.e. not relative values. After these fields, the NEIGHBOR SET INFO field 215 comprises M pairs of fields 250, 255, each pair specifying the information of a single cell. The first field of the field pair, namely the FREQ DIFF×field 250 specifies the BCCH frequency of the cell in the way specified in the FREQ DIFF TYPE field 245. The CELL×INFO field 255 recites the rest of the cell information of the particular cell. The CELL×INFO field 255 is also a structured field comprising a plurality of fields. The structure of the CELL× INFO field 255 is described later in this specification with reference to FIG. 5.

Figure 4:
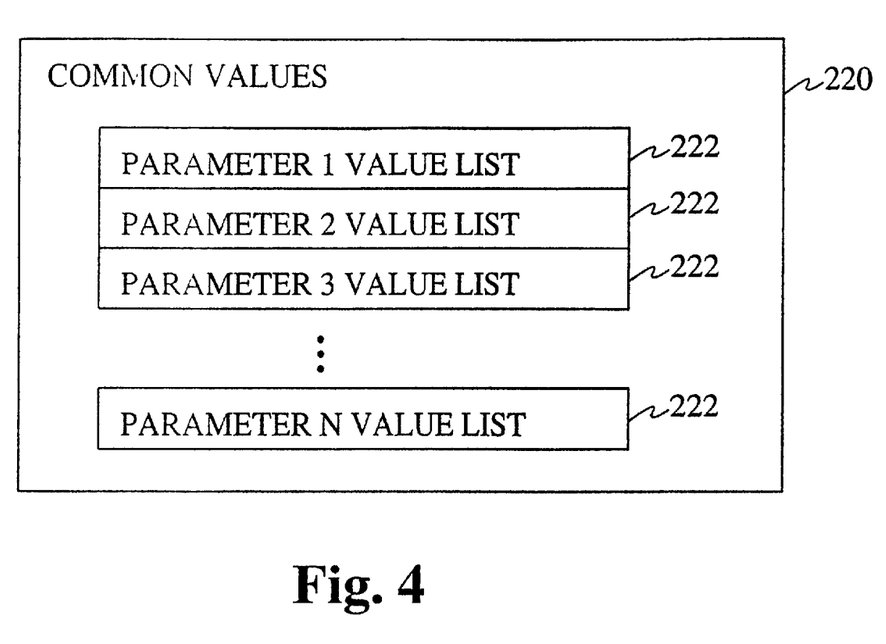

FIG. 4 illustrates the structure of a COMMON VALUES field 220. The field comprises PARAMETER×VALUE LIST fields 222, each reciting those values of a certain parameter which values are used in the cells of the current neighbor set. There may be N such fields in a COMMON VALUES field 220, the number N being any integer equal to or larger than one. The invention is not limited to using any specific particular data structure such as a list structure in a PARAMETER×VALUE LIST, since a set of values can be stored in many different ways using many different data structures.

Figure 5:
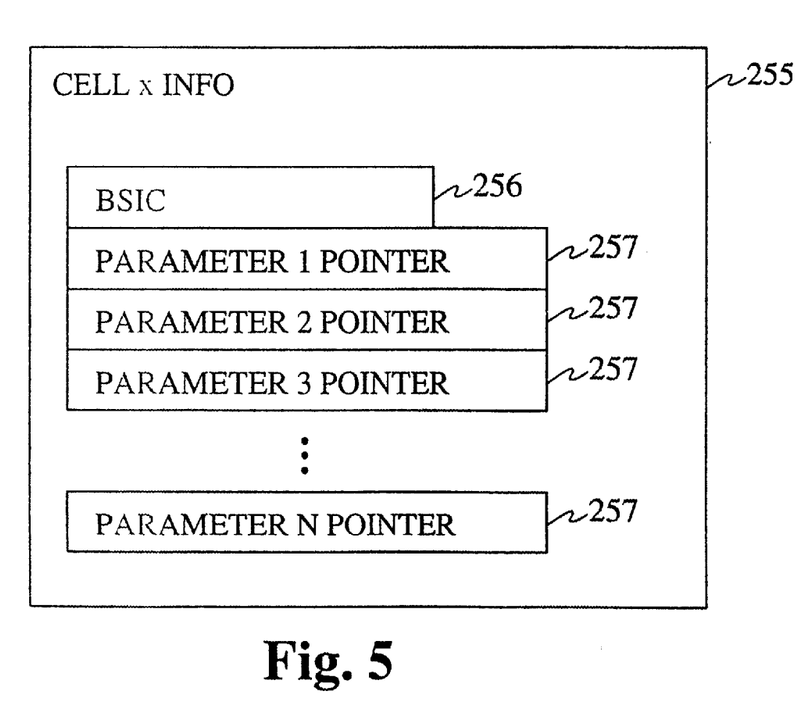
FIG. 5 illustrates the structure of a field shown in FIG. 3.

FIG. 5 illustrates the structure of a CELLxINFO field 255. This field specifies the information concerning a single neighbor cell. The CELLxINFO field 255 comprises a BSIC field 256, which specifies the BSIC (base station identity code) of the cell. In addition to the BSIC field 256, the CELLxINFO field 255 may comprise also other fields which always contain cell specific information. The CELLxINFO field 255 also comprises PARAMETER×POINTER fields 257, each of which contains a pointer specifying which of the values of the corresponding PARAMETER×VALUE LIST field 222 is to be used for the particular cell being described by the CELLxINFO field 255.

The length of the PARAMETER×POINTER fields can be always the same, such as 4 bits, which would allow representation of 16 different values, which is the maximum number of neighbor cells in the neighbor cell list according to current GSM 04.08 specification. However, the network often informs the MS about less than 16 neighbor cells, and often the cells do not have many different values of the same parameters. Therefore, three or even two bits would often be enough, allowing respectively the specification of eight or four parameter values. To shorten a neighbor cell information message even further, the length of the PARAMETER×POINTER fields can be made variable. In such an embodiment, the CELLxINFO field preferably comprises for example a three-bit field before the PARAMETER×POINTER fields, which three-bit field specifies the length of the PARAMETER×POINTER fields 257 in the current CELLxINFO field 255.

As described previously, a PARAMETER×POINTER field can indicate the value of a single parameter. However, in a further advantageous embodiment of the invention, the COMMON VALUES field comprises one or more sets of parameter combinations, which parameter combinations are referred to using pointers or some other ways of indicating an element of a set. One parameter value combination can specify the values of two or more parameters. Such an embodiment is advantageous in cases, when certain parameter value combinations are common in the neighbor cells, and allows further reduction of the size of neighbor cell information message.

The message structure illustrated in FIGS. 2, 3, 4, and 5 is only an example of an advantageous embodiment of the invention, and does not limit the invention in any way.

D. An Example of a System

Figure 6:
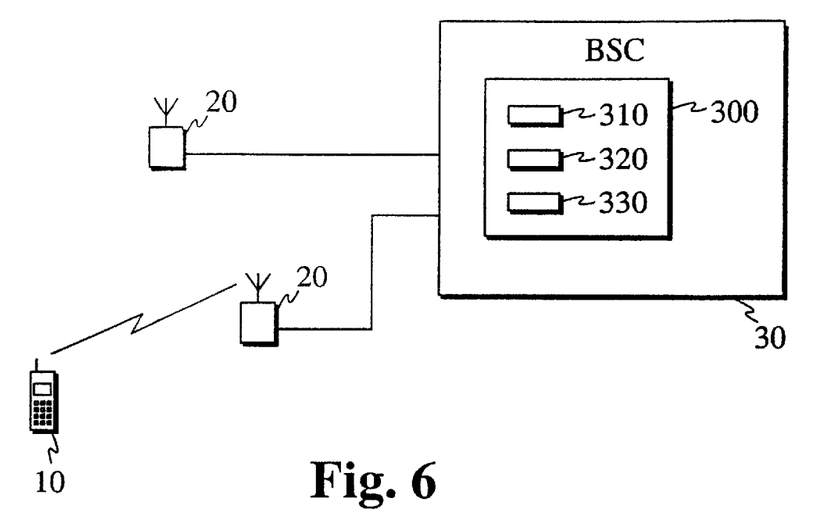
FIG. 6 illustrates a system according to an advantageous embodiment of the invention.

In the following, a system according to an advantageous embodiment of the invention will be described with reference to FIG. 6. FIG. 6 illustrates a part of a cellular telecommunication system, namely a base station controller (BSC) 30 and two base stations 20. A mobile station 10 is also illustrated. According to the invention, the BSC comprises a system 300 for generating a neighbor cell information message specifying values of a plurality of values of a plurality of parameters for at least one neighbor cell. The system 300 comprises means 310 for identifying parameter values in use by more than one cell, means 320 for outputting a set of said identified values, and means 330 for indicating the value of a parameter, which means for indicating is arranged to output the value of the parameter when the value is not one of said identified values, and to output information specifying an element of said set, when the value is one of said identified values.

Preferably the means 310, 320, and 330 are realized using software programs stored in a memory element of a control unit of the network element such as a BSC, the programs being executed by a microprocessor of the control unit.

The inventive system can advantageously be implemented in a base station controller (BSC). However, the invention is not limited to implementation in a BSC, since the system can also be implemented in other network elements.

E. An Example of a Mobile Communication Means

Figure 7:
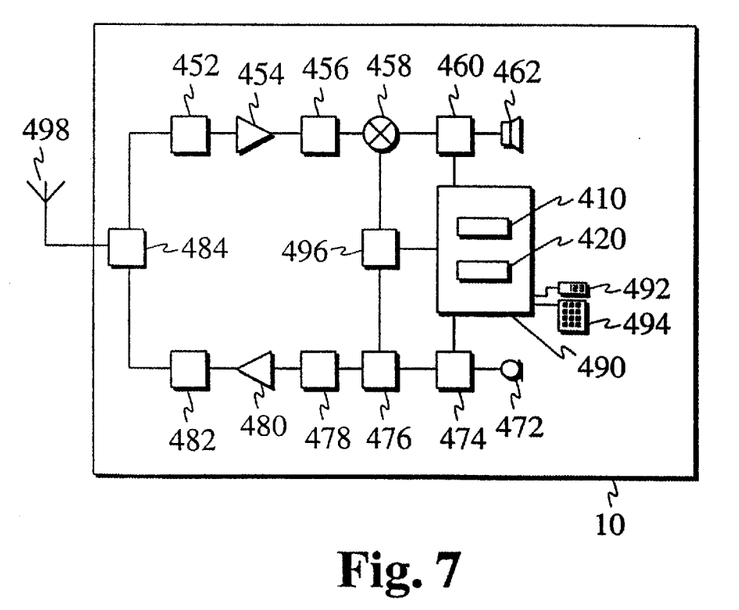
FIG. 7 illustrates a mobile communication means according to an advantageous embodiment of the invention.

In FIG. 7, a block diagram of a mobile station 10, or generally a mobile communication means 10 according to a further advantageous embodiment of the invention is shown. The receiver part of the mobile communication means comprises a first receiver filter 452 for filtering the received signal, a receiver amplifier 454 for amplifying the received signal, a second receiver filter bank 456 for further filtering of the received signal, a mixer 458 for converting the received signal to baseband, a receiver block 460 for demodulating and decoding the signal and an earpiece 462 or a loudspeaker 462 for producing the audible received signal. The transmitter part comprises a microphone 472, a transmitter block 474 for coding the signal to be transmitted and performing other necessary signal processing, a modulator 476 for producing the modulated radio frequency signal, a first transmitter filter 478, a transmitter amplifier 480, and a second transmitter filter 482. The mobile communication means further comprises an antenna 498, an oscillator block 496, a control block 490, a display 492 and a keypad 494. The control block 490 controls the functioning of the receiver and transmitter blocks and the oscillator block, as well as displays information to the user via the display 492 and receives commands from the user via the keypad 494.

According to the invention, a mobile communication means 10 further comprises at least a) means 410 for receiving a neighbor cell information message comprising a set of parameter values, and for each cell of a plurality of neighbor cells, cell information comprising at least one parameter value for a first parameter, and for at least one second parameter, one second value indicating which value of said set of parameter values is used for said second parameter, b) means 420 for associating a value of said set of parameter values indicated by one of said second values with the corresponding parameter of a neighbor cell.

Said first parameter can be for example the base station identity code BSIC.

Preferably the means 410 and 420 are realized using software programs stored in a memory element of a control block 490 of the mobile communication means 10, the programs being executed by a microprocessor of the control block 490.

A mobile communication means can be any mobile unit or a mobile station capable of communicating through the radio interface of a cellular telecommunications network such as a GPRS or a UMTS network. Examples of such mobile communication means are a cellular telephone, a video telephone, and a GPRS data terminal.

F. Further Considerations

The inventive method has the advantage, that the same pieces of information i.e. parameter values are not repeated many times in one neighbor cell information message. This saves transmission capacity of the signaling channel, and shortens the time required for sending a single message, which in turn allows the receivers of the mobile stations to use more time to other duties.

The invention can be applied in any cellular telecommunication system, in which the network transmits neighbor cell information to mobile stations. Examples of such systems are the GSM system and the UMTS (Universal Mobile Telecommunication System) system, which may comprise packet data transmission systems such as the GPRS system.

The name of a given functional entity, such as the radio network controller, is often different in the context of different cellular telecommunication systems. For example, in the GSM system the functional entity corresponding to a radio network (RNC) is the base station controller (BSC). Therefore, the term radio network controller in the claims is intended to cover all corresponding functional entities regardless of the term used for the entity in the particular cellular telecommunication system. Further, the various command and field names such as the NEIGHBOR SET INFO field name are intended to be examples only, and the invention is not limited to using the command and field names recited in this specification.

In this specification and particularly in the following claims, the term frequency value means an indication of a frequency in some predefined way. The invention is not limited to any specific way of expressing a frequency, since a frequency can be expressed in many ways, for example in units of hertz (Hz), or for example by using a predefined channel numbering scheme, in which case a channel number corresponds to a certain frequency. Consequently, a channel number or some other channel identification value can be used as a frequency value.

The parameters, whose values are specified in a neighbor cell information message, can be any cell parameters which the mobile station needs to know when communicating with a particular cell. Such parameters can comprise for example the BCCH channel frequency of a cell, a spread spectrum code such as the code used in the pilot signal of a particular cell in spread spectrum based cellular systems, or for example packet transmission parameters of a packet data transmission system such as the GPRS system. The invention is not limited to any particular selection of parameters to be recited in a neighbor cell information message.

The term set in the following claims is not intended to limit the invention to using any specific data structure for storing a number of parameter values, since a set of values can be stored in many different ways using many different data structures as known by a person skilled in the art.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

What is claimed is:

1. A method for generating a neighbor cell information message in a cellular telecommunication network, wherein said neighbor cell information message informs a mobile station about cells nearby the mobile station (neighbor cells), said neighbor cell information message providing, for each neighbor cell, specific values for each of a plurality of parameters, wherein each parameter is a characteristic of a cell, comprising the steps of:

identifying common parameter values, wherein each of said common parameter values is a specific value common to at least two neighbor cells of the same parameter;

outputting a set of said identified common values; and generating a neighbor cell information message, in which the specific value of a parameter of a specific neighbor cell is indicated by specifying a member of said set of identified common values when the specific value is one of said identified common values.

2. The method of claim 1, further comprising the step of:

transmitting a set of specific parameter values to a mobile station; and indicating, for each of a plurality of neighbor cells, the specific value of a parameter by specifying a member of said set of specific parameter values.

3. The method claim 1, further comprising the step of:

transmitting a set of combinations of specific values for at least two parameters to a mobile station; and indicating, for each of a plurality of neighbor cells, the combination of specific values of the at least two parameters by specifying a member of said set of specific value combinations for at least two parameters.

4. The method of claim 2, wherein the neighbor cells of said plurality of neighbor cells for which said list indicates the specific parameter value from said set of specific parameter values form a neighbor set, wherein there are a plurality of neighbor sets, and, for each neighbor set, a set of specific parameter values is generated for the parameters of the neighbor cells within that neighbor set.

5. The method of claim 1, wherein a frequency is one of the plurality of parameters which characterize a cell, wherein a plurality of frequency values is specified by specifying a starting frequency value and specifying the following specific frequency values by their values relative to said starting frequency value.

6. The method of claim 1, wherein a frequency is one of the plurality of parameters which characterize a cell, wherein a plurality of frequency values is specified by specifying a frequency value by its value relative to a previously specified frequency value.

7. The method of claim 1, wherein the method is used in a UMTS network.

8. The method of claim 1, wherein the method is used in a GPRS network.

9. A system in a cellular telecommunication network for generating a neighbor cell information message, wherein said neighbor cell information message informs a mobile station about cells nearby the mobile station (neighbor cells), said neighbor cell information message providing, for each neighbor cell, specific values for each of a plurality of parameters, wherein each parameter is a characteristic of a cell, comprising:

means for identifying common parameter values, wherein each of said common parameter values is a specific value common to at least two neighbor cells of the same parameter;

means for outputting a set of said identified common values; and means for generating a neighbor cell information message, in which the specific value of a parameter of a specific neighbor cell is indicated by specifying a member of said set of identified common values when the specific value is one of said identified common values.

10. A network element of a cellular telecommunication network comprising the system of claim 9.

11. A mobile communication means for communication with a cellular telecommunication network, comprising:
   means for receiving a neighbor cell information message, wherein said neighbor cell information message comprises:
      a set of specific parameter values; and
      cell information, wherein, for each cell of a plurality of neighbor cells, said cell information comprises:
         at least one specific parameter value for a first parameter, and
         an index for a second parameter, said index indicating which value of said set of specific parameter values is used for said second parameter; and
   means for associating a specific value of said set of specific parameter values indicated by one of said index with the corresponding second parameter of a neighbor cell.

12. The system of claim 10, wherein the network element comprises at least one of abase station controller (BSC) and a radio network controller (RNC).

13. The mobile communication means of clam 11, wherein the mobile communication means comprises a cellular telephone.

14. The mobile communication means of claim 11, wherein the fast parameter comprises abase station identity code (BSIC).

15. The method of claim 1, wherein the neighbor cell information message comprises:
   a message type field; and
   at least one neighbor cell set field pair, wherein a plurality of neighbor cells comprise a neighbor cell set, and wherein a neighbor cell set field pair comprises:
      a neighbor cell set information field, wherein said neighbor cell set information field comprises, for each cell in said neighbor set, a specific value or an index specifying a specific value of at least one parameter of the plurality of parameters; and
      a common values field matching the neighbor cell set information field, wherein the common values field comprises the specific value specified by the index.

16. The method of claim 15, wherein the neighbor cell set information field in the neighbor cell set field pair of the neighbor cell information message comprises:
   a stating frequency field indicating the starting frequency;
   a number of cells field indicating the number of neighbor cells in the neighbor set; and
   at least one neighbor cell field pair, wherein there is a neighbor cell field pair for each neighbor cell in the neighbor cell set, and wherein a neighbor cell field pair comprises:
      a frequency difference field indicating a specific value for a frequency of a neighbor cell in relation to the starting frequency indicated in the starting frequency field; and
      a neighbor cell information field comprising the specific value or the index specifying the specific value for at least one parameter of the plurality of parameters.

17. The method of claim 16, wherein the neighbor cell information field in the neighbor cell field pair of the neighbor cell set information field of the neighbor cell information message comprises:
   a base station identity code (BSIC); and
   the specific value or the index specifying the specific value for at least one parameter of the plurality of parameters.

18. The method of claim 17, wherein the common values field in the neighbor cell neighbor cell set field pair of the neighbor cell information message comprises the specific value specified by the index in the neighbor cell information field.

19. The method of claim 18, wherein the index specifying the specific value for at least one parameter of the plurality of parameters in the neighbor cell information field comprises a pointer to the specific value in the common values field in the neighbor cell set field pair of the neighbor cell information message.

20. A method for providing a neighbor cell information message of reduced length, wherein said neighbor cell information message informs a mobile station about cells nearby the mobile station (neighbor cells) in a cellular telecommunication network, said neighbor cell information message providing, for each neighbor cell, a specific value for a cell parameter, wherein a cell parameter is a characteristic of a cell, comprising the steps of:
   generating a neighbor cell information message in which, for at least one neighbor cell, an index is used to specify the specific value of the cell parameter for the at least one neighbor cell, wherein said index is shorter than the specific value of the cell parameter, wherein said index indicates the specific value in a list of specific values for the cell parameter;
   transmitting the neighbor cell information message to a mobile station; and
   transmitting the list of specific values for the cell parameter to the mobile station at least one of: (i) in the neighbor cell information message, (ii) with the neighbor cell information message, and (iii) separately from the neighbor cell information message.

* * * * *